US009292206B2

(12) United States Patent
Frost et al.

(10) Patent No.: US 9,292,206 B2
(45) Date of Patent: Mar. 22, 2016

(54) METHOD AND APPARATUS FOR OPTIMIZING THE PERFORMANCE OF A STORAGE SYSTEM

(71) Applicant: International Business Machines Corporation, Armonk, NY (US)

(72) Inventors: Holloway H. Frost, Houston, TX (US); Daniel E. Scheel, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/305,141

(22) Filed: Jun. 16, 2014

(65) Prior Publication Data

US 2014/0297934 A1    Oct. 2, 2014

Related U.S. Application Data

(63) Continuation of application No. 12/718,705, filed on Mar. 5, 2010, now Pat. No. 8,756,387.

(51) Int. Cl.
*G06F 12/00* (2006.01)
*G06F 3/06* (2006.01)
*G06F 12/02* (2006.01)

(52) U.S. Cl.
CPC .............. *G06F 3/061* (2013.01); *G06F 3/0655* (2013.01); *G06F 3/0679* (2013.01); *G06F 12/00* (2013.01); *G06F 12/02* (2013.01)

(58) Field of Classification Search
CPC ......... G06F 3/061; G06F 12/00; G06F 12/02; G06F 3/0655; G06F 3/0679
USPC .................................. 711/100, 111, 162, 202
See application file for complete search history.

(56) References Cited

U.S. PATENT DOCUMENTS

| 6,038,636 | A | 3/2000 | Brown et al. |
| 2004/0044705 | A1 | 3/2004 | Stager et al. |
| 2004/0148462 | A1* | 7/2004 | Uysal et al. ................... 711/118 |
| 2005/0050381 | A1 | 3/2005 | Maddock |
| 2005/0210218 | A1 | 9/2005 | Hoogterp |
| 2006/0282472 | A1* | 12/2006 | Ng et al. ....................... 707/200 |
| 2007/0006021 | A1 | 1/2007 | Nicholson et al. |

(Continued)

OTHER PUBLICATIONS

Gregg, B., "ZFS L2ARC," Fishworks Engineering, dated Jul. 22, 2008, [retrieved from the Internet on Oct. 6, 2009 using <URL: http://blogs.sun.com/brendan/entry/test>].

(Continued)

*Primary Examiner* — Gurtej Bansal
(74) *Attorney, Agent, or Firm* — Locke Lord LLP

(57) ABSTRACT

Methods and apparatuses for optimizing the performance of a storage system comprise a FLASH storage system, a hard drive storage system, and a storage controller. The storage controller is adapted to receive READ and WRITE requests from an external host, and is coupled to the FLASH storage system and the hard drive storage system. The storage controller receives a WRITE request from an external host containing data and an address, forwards the received WRITE request to the FLASH storage system and associates the address provided in the WRITE request with a selected alternative address, and provides an alternative WRITE request, including the selected alternative address and the data received in the WRITE request, to the hard drive storage system, wherein the alternative address is selected to promote sequential WRITE operations within the hard drive storage system.

17 Claims, 13 Drawing Sheets

(56) References Cited

U.S. PATENT DOCUMENTS

| | | |
|---|---|---|
| 2007/0028040 A1 | 2/2007 | Sinclair |
| 2007/0180175 A1 | 8/2007 | Hedin |
| 2007/0192627 A1* | 8/2007 | Oshikiri .................. 713/191 |
| 2007/0220202 A1 | 9/2007 | Sutardja et al. |
| 2007/0288692 A1 | 12/2007 | Bruce et al. |
| 2008/0074928 A1 | 3/2008 | Choi |
| 2008/0104309 A1 | 5/2008 | Cheon et al. |
| 2009/0067303 A1 | 3/2009 | Poo et al. |
| 2009/0249001 A1 | 10/2009 | Narayanan et al. |
| 2010/0169604 A1 | 7/2010 | Trika et al. |
| 2010/0306452 A1 | 12/2010 | Weber et al. |

OTHER PUBLICATIONS

Im, S. and Shin, D., "Storage Architecture and Software Support for SLC/MLC Combined Flash Memory," SAC '09, Mar. 8-12, 2009, pp. 1664-1669, copyright 2009 ACM.

Leventhal, A., "Flash Storage Memory," Communications of the ACM, Jul. 2008, vol. 51, No. 7, pp. 47-51, copyright 2008 ACM.

Kim, H. and Ramachandran, U., "FlashLite: A User-Level Library to Enhance Durability of SSD for P2P File Sharing," Proceedings of the 2009 29th IEEE International Conference on Distributed Computing Systems, Jun. 2009, pp. 534-541, IEEE Computer Society.

Adaptec, High-Performance Hybrid Arrays (HPHAs), HPHA Brief, Sep. 2009, copyright 2009 Adaptec, Inc.

Roberts, D., Kgil, T. and Mudge, T., "Integrating NAND Flash Devices onto Servers," Communications of the ACM, Apr. 2009, vol. 52, No. 4, pp. 98-106, [retrieved from the Internet on Oct. 6, 2009 using <URL: http://mags.acm.org/communications/200904/templates/pageviewer_print?pg=100&pm=9].

Gregg, B., "Introducing the L2ARC," Oracle, [retrieved from the Internet on Oct. 6, 2009 using <URL: http://www.sun.com/emrkt/openstorage/0309engineers.html?cid=e8017].

Huffman, A., "Non-Volatile Memory Host Controller Interface (NVMHCI) 1.0," dated Apr. 14, 2008, copyright 2007-2008 Intel Corporation.

Qureshi, M., Srinivasan, V. and Rivers, J., "Scalable High Performance Main Memory System Using Phase-Change Memory Technology," Proceedings of the 36th Annual International Symposium on Computer Architecture 2009, Jun. 20-24, 2009, Texas, pp. 24-33, copyright 2009 ACM.

Super Talent, "SLC vs. MLC: An Analysis of Flash Memory," Whitepaper, Super Talent Technology Inc., no date of publication available, [retrieved from the Internet on May 10, 2010 using <URL:http://www.supertalent.com/datasheets/SLC_vs_MLC%20whitepaper.pdf]. Original FileMetadata Shows Creation of Mar. 20, 2008.

Sliwa, C., "Low-cost MLC NAND flash gains in enterprise solid-state storage," Searchstorage.com, dated Sep. 8, 2009, copyright 2000-2009 TechTarget, [retrieved from the Internet on Oct. 6, 2009 using <URL: http://searchstorage.techtargetcom/news/article/0,289142,sid5_gci1367353,00.html].

Webster, J., "Controllers become the focal point for solid-state disk," cnet news, dated Jul. 15, 2009, [retrieved from the Internet on Oct. 6, 2009 using <URL: http://news.cnet.com/8301-21546_3-10287689-10253464.html].

Walp, D., "System Integrated Flash Storage," Microsoft Corporation, Microsoft WinHEC presented Nov. 7, 2008, California.

Oracle, "Oracle Real Application Clusters Administration and Deployment Guide 11g Release 1 (11.1)," copyright 1999, 2007 Oracle [retrieved from the Internet on May 19, 2010 using <URL: http://www.filibeto.org/sun/lib/nonsun/oracle/11.1.0.6.0/B28359_01/rac.111/b28254/storage.htm>].

Wikipedia, "Oracle Database," Wikipedia, the free encyclopedia, [retrieved from the Internet on May 20, 2010 using <URL: http://en.wikipedia.org/wiki/Oracle_Database>].

Wang et al., A Case for Redundant Arrays of Hybrid Disks, Nov. 11, 2008, IEEE Transaction on Magnetics, vol. 44, No. 11, pp. 1-4.

* cited by examiner

| ADDRESS RECEIVED FROM HOST 60 | ALTERNATE ADDRESS PROVIDED TO HARD DISC STORAGE 10 |
|---|---|
|  |  |
|  |  |
|  |  |
|  |  |
|  |  |

FIGURE 2B

METHOD AND APPARATUS FOR OPTIMIZING THE PERFORMANCE OF A STORAGE SYSTEM

CROSS REFERENCE TO RELATED APPLICATIONS

This application for patent is a continuation of U.S. Non-Provisional application Ser. No. 12/718,705, entitled "Method and Apparatus for Optimizing the Performance of a Storage System," filed Mar. 5, 2010, and incorporated herein by reference in its entirety.

STATEMENT REGARDING FEDERALLY SPONSORED RESEARCH

Not applicable.

REFERENCE TO APPENDIX

Not applicable.

BACKGROUND OF THE INVENTION

1. Field of the Invention

This disclosure relates generally to methods and apparatuses for optimizing the performance of a storage system for storing digital data.

2. Description of the Related Art

Hard disc drives have conventionally been used to store digital data in enterprise systems. One of the reasons for this extensive use of hard disc drives is that hard disc drive storage has often been the lowest cost storage medium suitable for such applications. There are, however, several drawbacks associated with hard disc drives. First, hard disc drives are often relatively slow in terms of their read/write performance when compared to other types of available storage media (such as FLASH memory). Second, hard disc drives that are subject to regular use are prone to failure. Such failures can often be traced to movement of the mechanical members within the disc drives, such as the head and arm. In general operation, a disc drive will engage in periods of "seeking" where the head of the hard drive is physically moved back and forth across the platters of the disc drive to retrieve or write data. Such "seeking" can result in failure of the physical mechanisms within a hard disc drive.

In an effort to overcome some of the limitations associated with hard disc drives, other forms of non-volatile storage media, such as solid state storage media have been utilized. One form of non-volatile storage media that has been used is FLASH memory. In general, FLASH memory is a much faster storage medium in terms of its read and write times than hard disc storage. However, FLASH storage has drawbacks which have limited its widespread use.

A first drawback is performance. The least expensive form of FLASH memory, multi-level cell (MLC) FLASH memory, is subject to rapid degradation such that the operation of such devices is prone to error. A second drawback is cost. There is an alternate form of FLASH memory that is more robust and durable than MLC FLASH memory known as single-level cell (SLC) FLASH memory. Such SLC FLASH memory is, however, substantially more expensive than both hard disc memory and MLC FLASH memory. As such, the cost issues associated with SLC FLASH memory have limited its widespread adoption in many enterprise applications.

Accordingly, what is needed is a more effective, efficient and optimal way to store digital data and utilize storage components within a storage system that addresses both cost and performance concerns.

SUMMARY OF THE INVENTION

The disclosed embodiments are directed to methods and apparatuses for optimizing the performance of a storage system. In some implementations, the disclosed embodiments involve a storage system for processing READ and WRITE requests from an external host. Such a storage system may comprise a FLASH storage system, a hard drive storage system, and a storage controller. The storage controller is adapted to receive READ and WRITE requests from an external host, and is coupled to the FLASH storage system and the hard drive storage system such that the storage controller can issue READ and WRITE requests to both the FLASH storage system and the hard drive storage system. In general operation, the storage controller receives a WRITE request from an external host, the WRITE request containing data and an address corresponding to a location where such data is to be stored. The storage controller then forwards the received WRITE request to the FLASH storage system and associates the address provided in the WRITE request with a selected alternative address, and provide an alternative WRITE request to the hard drive storage system, wherein the alternative WRITE request includes the selected alternative address and the data received in the WRITE request, and wherein the alternative address is selected to promote sequential WRITE operations within the hard drive storage system. The storage controller also receives a READ request from an external host, the READ request containing an address corresponding to a location from which data is to be read. The storage controller thereafter forwards the received READ request to the FLASH storage system, returns the data received from the FLASH storage system to the external host in the absence of a READ error from the FLASH storage system, or issues an alternative READ request to the hard drive storage system, the alternative READ request containing an address corresponding to an alternative address associated by the storage controller with the address received from the external host in the READ request and returning the data received from the hard drive storage system to the external host in the event of a READ error from the FLASH storage system.

In some implementations, the disclosed embodiments involve a system comprising MLC FLASH memory providing a given physical MLC FLASH storage space, a hard drive storage providing a given physical storage space, and a storage controller coupled to the MLC FLASH memory and the hard drive storage. The storage controller is adapted to receive a WRITE request from an external host that contains data and an address where such data is to be stored, write the data provided in the WRITE request to a physical location within the MLC FLASH memory and to a physical location within the hard drive storage. The storage controller is further adapted to receive a READ request from an external host that contains an address from which data is to be read, access a physical location within the MLC FLASH memory corresponding to the address received in the READ request, and provide data stored at that address to the external host in the absence of a READ error from the MLC FLASH memory, and to access a physical location within the hard drive storage and provide data stored at that address to the host in the presence of a READ error from the MLC FLASH memory.

In some implementations, the disclosed embodiments involve a storage controller comprising a first port adapted to receive READ and WRITE commands from an external host, a second port adapted to provide READ and WRITE commands to a FLASH storage device and to receive data from the FLASH storage device in response to an issued READ command, a third port adapted to provide READ and WRITE commands to a hard drive storage device and to receive data from the hard drive storage device in response to an issued READ command. The storage controller further comprises a processor coupled to the first, second, and third ports, wherein the processor is programmed to receive a WRITE command containing an address and data through the first port and issue WRITE commands through both the second and the third ports such that the data provided in the WRITE command is provided through the second port and the third port. The processor is further programmed to receive a READ command requesting data and issue a preferred READ command through the second port and a secondary READ command through the third port upon the receipt of error data in response to the preferred READ command.

Other embodiments are disclosed and claimed.

BRIEF DESCRIPTION OF THE DRAWINGS

FIGS. 2A-2C illustrate exemplary embodiments of the operation of the storage controller 30 of the system 100 of FIG. 1.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Figure 1:
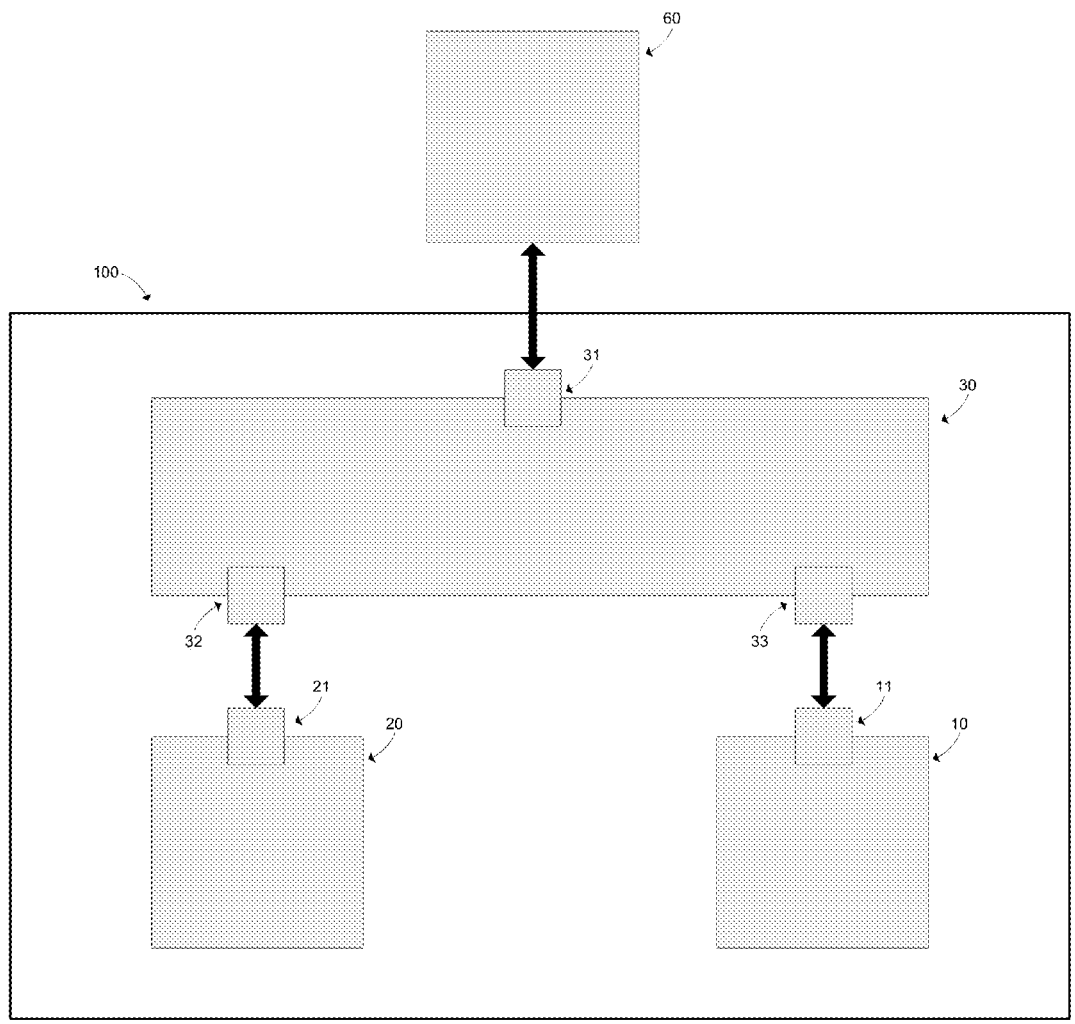
FIG. 1 illustrated a novel storage system 100 in accordance with certain teachings of the present disclosure.

Turning to the drawings and, in particular, to FIG. 1, a novel storage system 100 is illustrated. In the illustrated example, the storage system includes three main components: a hard disc storage device 10 (sometimes referred to as a hard drive); a FLASH memory storage device 20; and a storage controller 30.

The hard disc storage device 10 may be any suitable hard disc based storage device that is capable of: (a) receiving a WRITE request containing data and an address of a location where the data is to be stored and storing the data at the provided location and (b) receiving READ request containing an address and obtaining and providing the data stored at that location. In general, with the hard disc storage device, the addresses received in connection with WRITE and READ requests will correspond to specific physical locations within the hard disc storage device.

As reflected in FIG. 1, in the exemplary embodiment, the hard disc storage device 10 includes at least one data port 11. The data port 11 may be any suitable data port that is adapted to receive READ and WRITE requests. Examples of such types of data ports include, but are not limited to, SCSI ports, Fibre Channel ports, Infiniband ports, and any other suitable port. In the embodiment of FIG. 1, the data port 11 of the hard disc storage device is coupled to receive READ and WRITE requests from the storage controller 30.

The hard disc storage device 10 may be a single hard disc or an array of hard disc drives. When the hard disc storage device 10 comprises an array of hard disc devices, the hard disc devices comprising the storage device 10 may be arranged in any known array manner. For example, the hard disc storage device 10 may comprise a plurality of hard disc devices arranged into a RAID array where data protection techniques are implemented to address failures. When so arranged, data written to the hard disc storage device 10 may be written in a striped manner such that data that is to be written to the hard disc storage device 10 is written across a plurality of the hard disc devices within the array. In such an embodiment, the memory space provided by the hard disc storage device will be striped across multiple hard disc devices. Thus, in this embodiment a storage location may be located in a given hard disc drive such that sequential storage locations will be distributed across a plurality of hard disc drives.

Alternate embodiments are envisioned wherein the hard disc storage device 10 comprises a plurality of hard disc devices where the memory space presented by the hard discs within the array is such that, with limited exceptions, sequential storage locations are sequentially located within the same physical hard disc drive. In such an embodiment, the memory space will be associated with the hard disc drives within the array such that a first grouping of sequential memory locations (e.g., the first 10 GB of memory space) corresponds to locations within a first hard disc and a second, subsequent grouping of memory locations (e.g., the second 10 GB of memory space) corresponds to locations within a second hard disc drive and so on.

The FLASH storage device 20 of FIG. 1 can comprise any suitable FLASH memory storage system that is capable of: (a) receiving a WRITE request containing data and an address of a location where the data is to be stored and storing the data at a location associated with the received address, and (b) receiving a READ request containing an address and providing the stored data associated with that address. In general, with the FLASH storage device, the addresses received in connection with WRITE and READ requests will not correspond to specific physical locations within the FLASH storage device 20. Instead, a controller within the FLASH storage device 20 will associate the addresses received in a WRITE request with a physical location within the FLASH storage device, where the physical address can, and usually will, vary from the received address. One example of a device that may be used as the FLASH storage device 20 is the RamSan-620 FLASH storage device available from Texas Memory Systems, Inc.

As reflected in FIG. 1, in the exemplary embodiment the FLASH storage device 20 includes a data port 21. In the embodiment of FIG. 1, the data port 21 is a Fibre Channel data port that is coupled to receive READ and WRITE requests from the storage controller 30. Alternate embodiments are envisioned wherein the FLASH storage device 20 includes multiple data port including, potentially, data ports adapted to receive READ and WRITE commands from devices other than the storage controller 30.

Referring to FIG. 1, it may be noted that the storage controller 30 includes three data ports 31, 32 and 33.

In general, the data port 31 is adapted to receive WRITE requests from the external host 60, where each WRITE request include data and an address location where the data is to be stored. The data port 31 is also adapted to receive READ request from the external host, where each read request that include an address location from which data is to be retrieved. The data port 31 may take various forms and may constitute any known data port for the reception and transmission of digital data. For example, the data port 31 may be any of a Fibre Channel Port or a SCSI Port.

In addition to the data port 31 described above, the storage controller 30 includes additional data ports 32 and 33. Data port 32 allows for the transmission of READ and WRITE requests and responsive information between the storage controller 30 and the FLASH storage device 20. Data port 33 allows for the same type of communications between the storage device 30 and the hard disc storage device 10. Like data ports 31, the data ports 32 and 33 may take various forms. In the example of FIG. 1, data port 33 is a SCSI data port and data port 32 is a Fibre Channel data port.

In operation, the storage controller 30 receives READ and WRITE commands from the external host 60. The storage controller 30 then process the received commands to ensure efficient operation of the overall system. As described below, the storage controller 30 operates to promote sequential writing to the hard disc storage device 10. The use of such sequential writes dramatically reduces the amount of mechanical movement typically associated with WRITE operations to a hard disc storage device and, therefore, can greatly extend the operating life of the hard disc devices with the hard disc storage device 10 since extensive "seeking" is reduced as a result of the use of alternate WRITE commands. Such seeking is reduced, since the amount of movement of the hard disc head(s) for multiple WRITE operations will be minimal.

In addition, as described in more detail below, the storage controller 30 operates to ensure that as many READ operations as possible are processed using data stored in the FLASH storage device 20. Using the FLASH storage device 20 to process most READ operations reduces the utilization of the hard disc devices within the hard disc storage device 10 and, as such, can operate to extend the operating life of the hard disc devices.

In addition to the above, the storage controller 30 operates to use information stored in the hard disc storage device 10 to correct any errors that may be detected with respect to the data stored in the FLASH storage device 20.

Through the operation described above, the storage system 100 operates to extend the life of the hard drive storage device 10 by operating to ensure that all, or substantially all, of the WRITE operations to the storage device 10 involve physically sequential memory locations and by operating to ensure that READ operations are performed on the hard drive storage device 10 only when the preferred READ device, specifically the FLASH storage device 20, exhibits a READ error or failure.

Various embodiments of the storage controller 30 are envisioned. Examples of such embodiments are illustrated in FIGS. 2A-2C.

Initially the processing of received WRITE operations will be discussed.

Figure 2A:
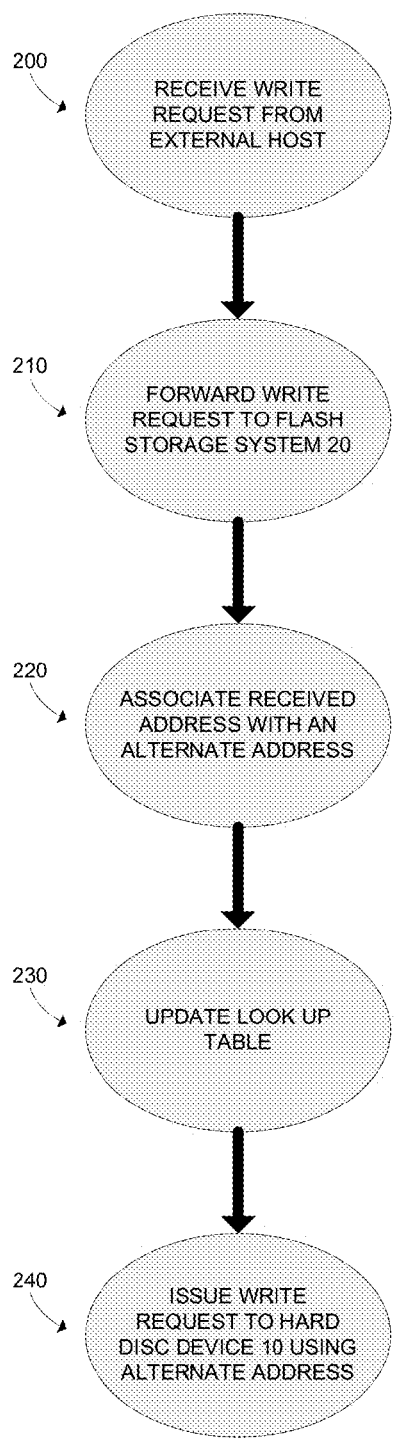
Figure 2C:
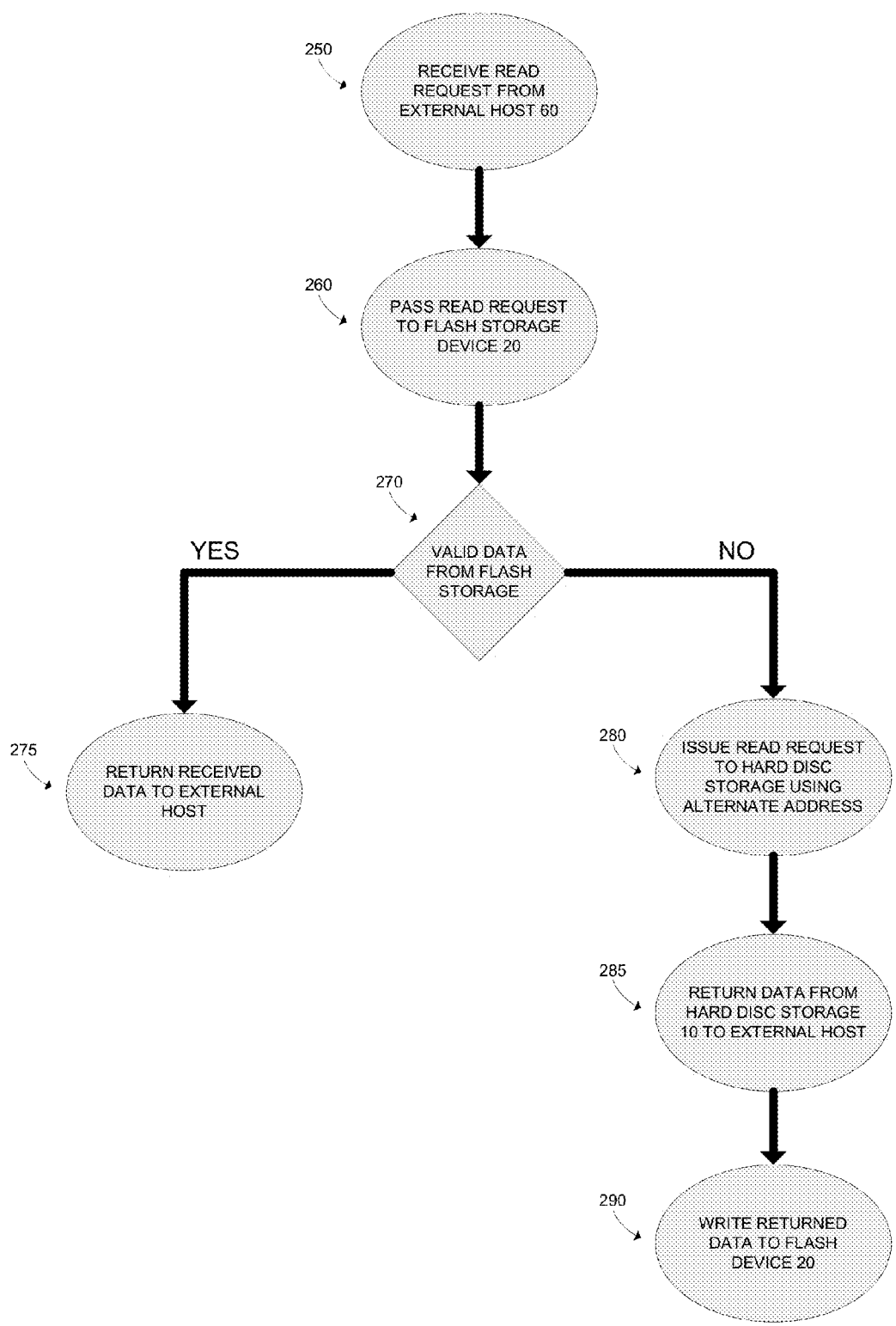

In the illustrated embodiment of FIG. 2A, the system controller 30 operates in accordance with a process where it will receive a WRITE request at step 200. The WRITE request will include an address location, ADDRESS and DATA to be stored at that address location.

In step 210, the storage controller 30 will forward the received WRITE request, without modification to the FLASH storage device 20 for processing. The FLASH storage device 20 will then process the WRITE request and store the DATA at a location that corresponds to the address received in the WRITE request. As is common with FLASH storage devices, the FLASH storage device 20 will store the DATA at a physical location within the FLASH memory device 20 that has an address that differs from the ADDRESS received with the write command but will maintain a table that associates the received ADDRESS with the physical address within the FLASH memory device where DATA is stored. This general operation of the FLASH memory device 20 is set forth in U.S. patent application Ser. No. 12/554,891 entitled "Method and Apparatus for Protecting Data Using Variable Size Page Stripes in a Flash-based Storage System" filed on Sep. 5, 2009, which is hereby incorporated by reference.

In step 220, the system controller 30 will consider the ADDRESS provided in the received WRITE request and associate the received ADDRESS with an alternate address, ALT_ADDRESS. The ALT_ADDRESS will be selected such that the ALT_ADDRESS is sequential with respect to ALT_ADDRESS used with respect to last WRITE command issued to the hard drive storage device 10. For the first received WRITE operation, the selected alternative address ALT_ADDRESS may be selected as the lowest available address at which the hard drive storage device can store data. For the second and subsequent received WRITE requests, the selected alternative address, ALT_ADDRESS, will be such as to ensure that all writes to the hard drive storage device 10 are sequential.

In step 230, the system controller 30 will update a lookup table that maps each address received by the system controller 30 with the alternative addresses that the storage controller 30 associated with the received address. One example of such a table is reflected in FIG. 2B. In step 240, the system controller will then issue a WRITE request to the hard drive storage device that includes the DATA received by the system controller 30 and the alternative address ALT_ADDRESS selected by the system controller in step 220.

By selecting the alternative addresses to be used in the issuance of WRITE requests to the hard drive storage device such that the writes to the hard drive storage device are sequential, the storage controller 30 operates to greatly reduce the extent of the movement of the heads of the hard drives within the hard drive storage device 10, thus significantly expanding the actual and expected operating life of such devices.

In embodiments where the hard drive device 10 includes multiple drives arranged such that data is written to the hard drive device 10 in a striped manner, the system controller 30 can select the alternative addresses, ALT_ADDRESS, for multiple WRITE operations such that that each WRITE operation to a given specific hard disc drive sequentially follows the immediately previously received WRITE operation for that specific hard drive. Thus, in this embodiment, while the actual ALT_ADDRESSES from one WRITE operation to another may not be sequential (because the WRITE operations may be processed by different hard drive devices) the WRITE operations provided to individual hard drive devices will be such that the writes to each individual hard drive are made to sequential physical locations. In the embodiment where the hard drive storage device 10 includes multiple hard discs arranged such that the available memory space within one hard drive is written to before data is written to another hard drive, the alternative addresses from one WRITE operation to another will generally be directed to sequential physical locations, except, potentially, for WRITE operations that result in the issuance of a WRITE command to a hard drive that differs from the hard drive used to process the immediately previous WRITE request.

FIG. 2C generally illustrates the processes used by the storage controller 30 to process READ requests in this first embodiment.

In general, the READ request is first received by the system controller 30 at step 250. In this embodiment, the READ request will comprise a request for the system 100 to provide the data stored at a specific requested address, ADDRESS.

In the embodiment of FIG. 2C, the READ request will be passed by the system controller 30 to the FLASH storage device 20 at step 260. In response to the READ request, the FLASH storage device 20 will process the READ request and return to the system controller 30 either: (a) DATA, or (b) an indication that there was a failure or an error in processing the READ request. In some embodiments, the indication that there was a failure or an error in processing the READ request will be accompanied by some data, although the indication of the failure or error will indicate that the data is likely corrupted. In this embodiment, the FLASH storage device 20 internally determines whether the data corresponding to the READ request is valid data using know techniques.

In step 270, the system controller 30 will consider the response from the FLASH storage device 20. If the response indicated that the DATA was valid data, then system controller 30 will provide the received data to the external host system 60 that issued the READ request at step 275. If the response indicated that there was a failure or error in the reading of the data from the FLASH storage device 20, then the system controller will attempt to access the corresponding data in the hard drive storage device 10. This is performed in step 280 where the system controller will use the stored table described above (see FIG. 2B) to identify the ALT_ADDRESS within the hard drive storage device that corresponds to the ADDRESS in the received READ request and then issue a READ command to the hard drive storage device 10 using the identified ALT_ADDRESS. The storage controller will then provide the data retrieved form the hard disc storage device 10 to the external host in step 285.

In one embodiment, the system controller 30 will also issue a WRITE command to the FLASH storage system 20, in step 290, using the received ADDRESS and the DATA obtained from the hard drive storage device 10 to ensure that the data corresponding to the received ADDRESS is validly stored in the FLASH memory device.

Through the process described above, the system controller 30 will ensure that most READ operations are processed using the FLASH storage device 20 and that READ operations are only performed on the hard drive storage device 10 when there is an error or failure associated with a READ of the FLASH storage device. Because it is anticipated that such errors and/or failures will occur in connection with a minority of the READ operations, the described system will tend to minimize the wear and tear associated with the hard drive storage device 10, and thus extend and prolong the life of that device.

In the embodiment described above in connection with FIGS. 2A-2C, the alternative addresses selected for consecutive WRITE operations are selected such that the physical location used for a given write operation is immediately physically adjacent to the physical location used to store data from the immediately preceding WRITE operation. While this embodiment can be beneficially implemented, alternate embodiments are envisioned that can result in further reductions in the amount of movement in the heads of the hard disc devices within hard drive storage device 10. Such an embodiment can select the alternative addresses in the hard disc storage device based on the actual position of the head within the hard disc storage devices.

In such an embodiment, the step of assigning the alternative address is not necessarily based on the ALT_ADDRESS used for the immediately preceding WRITE request. It is, instead, based on the actual position of the head of the hard disc drive that will process the next WRITE request. While this location may correspond to the ALT_ADDRESS used with respect to a preceding WRITE operation, in instances where a WRITE operation is immediately preceded by a READ operation it may not. Therefore, in this embodiment, the system controller 30 will maintain an indication of the locations of the heads within the various hard discs comprising the hard drive storage device 10. When issuing a WRITE command to a given device, the system controller 30 in this embodiment will select an ALT_ADDRESS location in step 220 that represents the available storage location that is physically closest to the head position at the time the WRITE request is received. By selecting such a physically-near available location the extent of the head travel, and thus the wear imposed on the hard disc device, can be reduced.

It should be noted that in all of the embodiments set forth in FIGS. 2A-2C, the system controller 30 will maintain the table of received ADDRESSes and ALT_ADDRESSes to optimize the overall operation of the system. As such, storage locations within the hard drive storage device 10 will, over time, become stale and will no longer reflect valid data. For example, assume that in a first instance storage controller 30 receives a WRITE request for the system 100 to store a given data set (DATA 1) in a location corresponding to a given address (ADDRESS_1). The system controller 30 will process the WRITE request by selecting an alternative address, ALT_ADDRESS_1, using one of the approaches described above.

Assume that at a later time the system controller receives a second request to write a different data set (DATA_2) to the same given address (ADDRESS_1). As before, the system controller 30 will process the WRITE request by associating the received address (ADDRESS_1) with a second alternative address (ALT_ADDRESS_2). To ensure that the writes to the hard drive storage device 10 are sequential, the system controller 30 will almost always select a second alternative address, ALT_ADDRESS_2, that is different from the first alternative address, ALT_ADDRESS_1. As such, after the processing of the second received WRITE request, the data stored at the physical location corresponding to the first alternative address, ALT_ADDRESS_1, will now be "stale" and no longer valid and there will be no entry in the lookup table described above in connection with FIG. 2C that points to the physical location corresponding to ALT_ADDRESS_1. To optimize the overall operation of the storage system 100, the system controller 30 can utilize idle time to "compact" the data stored within the hard drive storage device 10 to "fill" in memory locations corresponding to stale or invalid data and to free up space so that additional sequential WRITE operations can be performed in the future.

Figure 3:
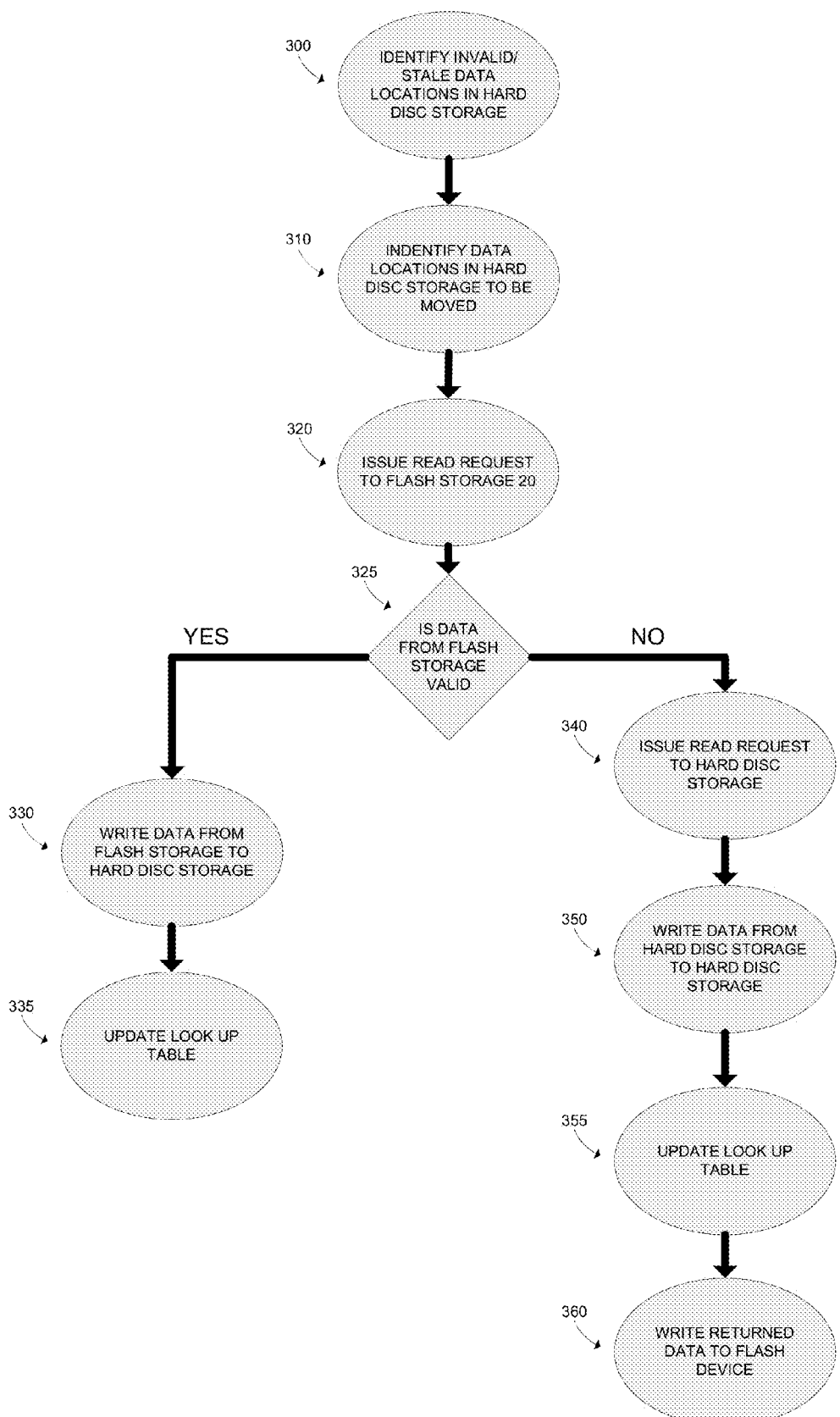
FIG. 3 illustrates an exemplary process for compacting data within the hard drive storage device 10 of the system 100 of FIG. 1.

One approach for compacting data within the hard drive storage device 10 is reflected in FIG. 3. As noted in the processes outlined in FIG. 3, the compacting of data within the storage device 10 is performed with preferred data READs from the FLASH storage device 20 and not through the use of preferred data READs from the hard disc storage device 10.

Referring to FIG. 3, a process is illustrated that the system controller 30 can execute during idle time when it is not otherwise processing READ or WRITE commands from the external computer or host system 60. Initially, the storage controller 30 will identify physical memory locations within the physical space of the hard drive storage device that are no longer valid and/or are stale in step 300. In one embodiment, the storage controller 30 will not initiate a compacting operation until it has identified a specific number of invalid/stale memory locations that are located within a general physical region of a given hard disc device.

In step 310, the system controller 30 will identify data stored at specific alternative addresses that is subject to movement to optimally compact the data stored in the hard drive system 10. This data can be data that is stored in one or more physical locations, or groups of physical locations, that are surrounded by one or more locations containing stale/invalid data.

Once the data to be moved is identified, the storage controller will issue READ requests to the ADDRESSes corresponding to the identified alternative addresses at step 320. The READ requests will be issues to the FLASH storage device 20. Assuming that the data provided in response to the READ requests is determined to be valid (or not reported to be invalid or erroneous) in step 325, the system controller 30 will WRITE the received data to the identified physical memory locations that previously contained stale/invalid data at step 330 and will update its internal lookup table to associate the new address where the data was stored as the ALT_ADDRESS for the corresponding ADDRESS information at step 335. Only in instances where the READ requests issued to the FLASH storage device 20 result in faulty or erroneous data will any READ operations be issued to the hard drive storage device 10 as part of a compacting operation and such a READ request will be issued at step 340. The retrieved data will then be written to the appropriate locations within the hard disc storage device 10 and the lookup table within the storage controller 30 will be updated at steps 350 and 355. The retrieved data will then be written to FLASH memory in step 360.

In embodiments where the data stored in the hard drive storage device 10 using striping, one or more data protection schemes may be used to protect the data, In one such protection schemes, data corresponding to data stored in multiple hard disc devices within the had drive storage device 10 is combined, through an exclusive OR operation to produce data protection data. The general use of such XOR data to protect data stored in different FLASH chips is disclosed in U.S. patent application Ser. No. 12/554,891 entitled "Method and Apparatus for Protecting Data Using Variable Size Page Stripes in a Flash-based Storage System" filed on Sep. 5, 2009, which is herein incorporated by reference.

In the embodiment where protection data is utilized, to calculate the protection data used to protect data stored at a location within one of the disc drives within the hard drive storage device 10, it may be necessary to use data stored within a different hard disc within the hard drive storage device. In one embodiment, such data is obtained from the corresponding location within the FLASH memory device 10 to reduce the issuance of READ commands to the hard drive storage device 10.

The storage controller 30 may be implemented using conventional programmable and/or programmed devices. One exemplary embodiment of the system controller 30 is illustrated in FIG. 4.

Figure 4:
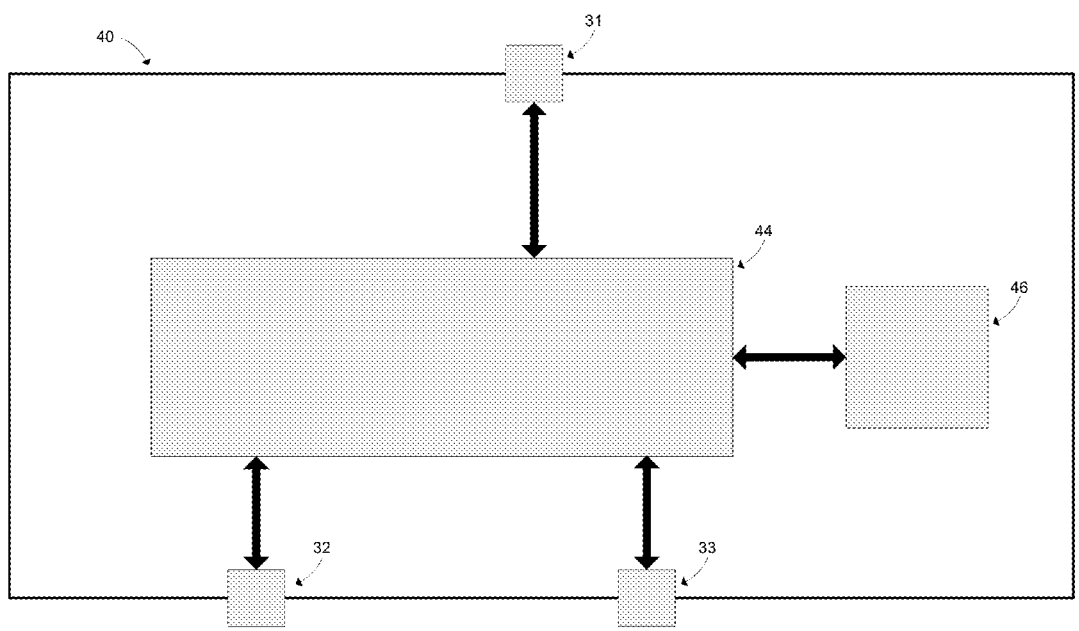
FIG. 4 illustrates an exemplary construction for the storage controller 30 of the system 100 of FIG. 1.

Referring to FIG. 4, the illustrated exemplary storage controller 40 includes data ports 31, 32 and 33 as described above in connection with FIG. 1. In the illustrated example, the each of the data ports comprises conventional data port processing circuitry and drivers of the type that may be mounted to a printed circuit board. The printed circuit board may also provide power to the described ports and couple the ports to a central processor 44. The central processor 44 may be a programmed microprocessor, a field programmable gate array, or any other programmed or programmable circuitry that can implement the processes described above in connection with FIGS. 2A-2C and FIG. 3. A memory device 46, such as RAM memory, is provided that may be used to store the programming code for processor 44 and/or the table that associates the received ADDRESSES with the alternative addresses, ALT_ADDRESSes, selected by the storage controller.

In FIG. 1, each of the main components 10, 20 and 30 is illustrated as being a physically separate unit. Alternate embodiments are envisioned wherein all or more than one such units are combined into a single physical device. Such an alternate embodiment is illustrated in FIG. 5.

Figure 5:
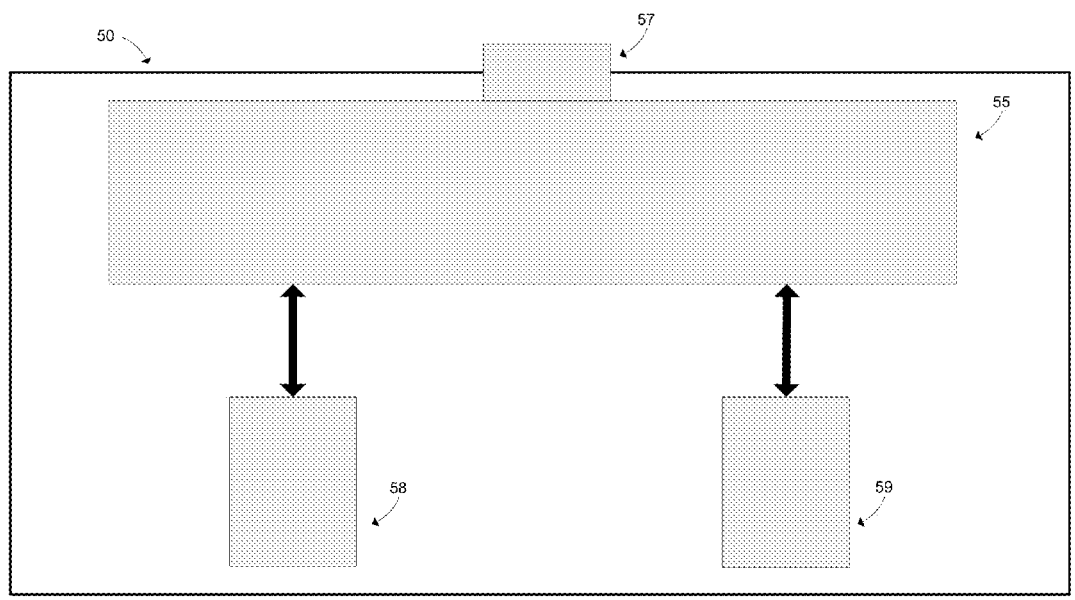
FIG. 5 illustrates an alternative embodiment of the storage system depicted in FIG. 1.

Referring to FIG. 5 an integrated storage system 50 is illustrated where a single system controller 55 performs the role of the storage controller 30 and the controllers that would typically be included within a stand alone FLASH storage system and/or a stand-alone hard drive storage system. The single system controller 55 receives READ and WRITE commands from an external host (not illustrated) through data port 57 and then directly accesses memory locations within a FLASH storage devices, such as FLASH memory chips 58, and within a hard disc array 59.

Because the described system provides a mechanism for obtaining the advantages available through the use of FLASH memory (speed) with many of the advantages available through the use of hard disc drives (low error rate), it enables the creation of a memory system that can beneficially use the cheapest form of FLASH memory, specifically MLC FLASH memory, yet still provide a memory system that is robust and that has a reasonable lifespan. Such a system is generally disclosed in FIG. 6.

Figure 6:
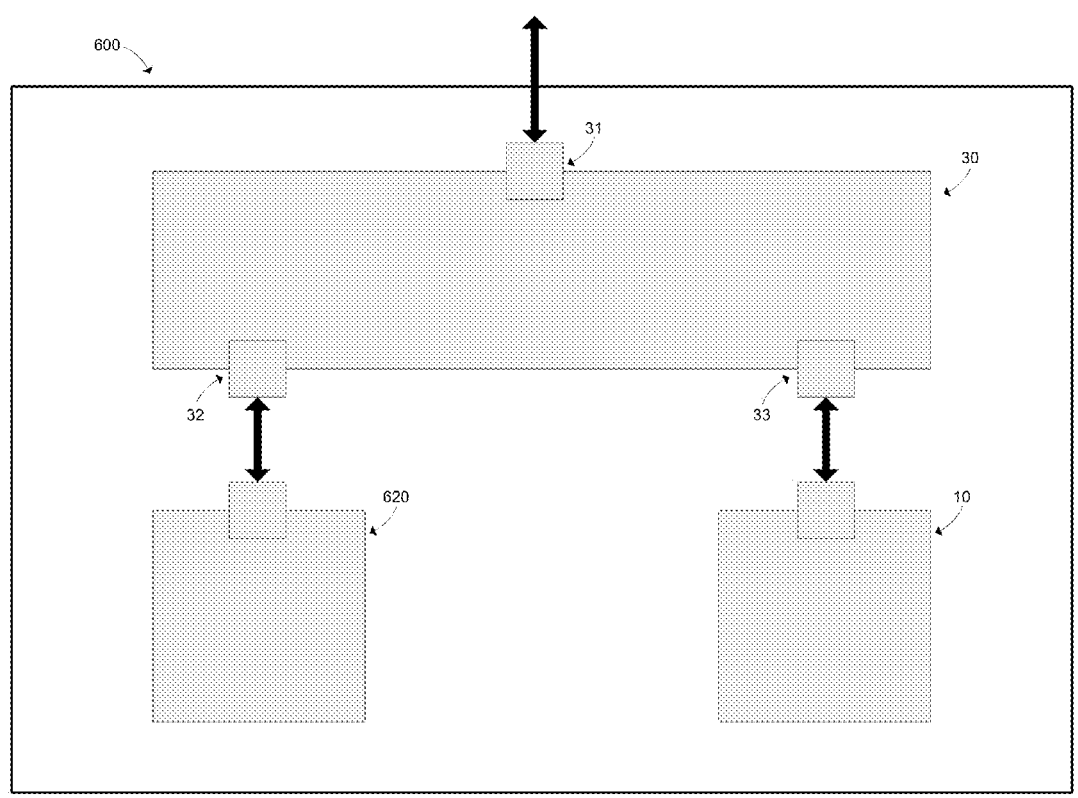
FIG. 6 illustrates yet another embodiment of the storage system depicted in FIG. 1 that utilizes a MLC FLASH memory space.

Referring to FIG. 6, a memory system 600 is disclosed that in overall structure and operation, corresponds to the memory system 100 described above in connection with FIG. 1. In the illustrated memory system, however, the FLASH memory used to construct the FLASH memory device, FLASH device 620, is exclusively or predominantly formed using MLC FLASH memory. Moreover, in the illustrated embodiment, the physical memory space provided by the MLC FLASH memory device 620 may be selected such that it is greater than the overall physical memory space provided by the hard drive storage device 10. In one embodiment, the physical memory space provided by the MLC FLASH storage device is multiples of the physical memory space provided by the hard drive storage device 10. As one example, the hard drive storage device 10 could provide 1 Terabyte of storage, while the MLC FLASH memory space could provide 2 Terabytes of storage. In yet another embodiment, the physical memory space provided by the MLC FLASH memory is greater than 150% of the physical memory space provided by the hard drive storage device 10.

In operation, the storage controller 30 within memory system 600 will provide a overall memory space to the host devices that is no greater than the physical memory space provided by the hard drive storage device. As such, the system 600 can operate generally as described above and, whenever it is determined that a given storage location within the MLC FLASH memory device has reached the end of its operating life (e.g., as a result of a detection of one or more errors with respect to the data stored in that location), that location can be removed from the list of memory locations within the FLASH memory device 620 available for the storage of data. Because the physical memory space provided by the FLASH memory device 620 is substantially greater than the physical memory provided by the hard drive storage device 10, the overall system 600 can—despite the removal of the FLASH storage location at issue—continue to provide an overall physical memory space to host devices as previously reported by the storage controller. As such, this described combination of fast, yet potentially failure-prone MLC FLASH memory, with a hard disc device can provide an overall system that provides the performance benefits available from FLASH memory, at a cost well below that typically associated with SLC FLASH memory, with protection against data errors/failures, and with an overall expected useful life exceeding the useful life typically associated with MLC FLASH memory.

FIGS. 7A-7D and 8 illustrate a system and method that may be implemented by one or more of the controllers discussed herein to provide for efficient sequential writes to a hard drive (or group of hard drives).

Figure 7A:
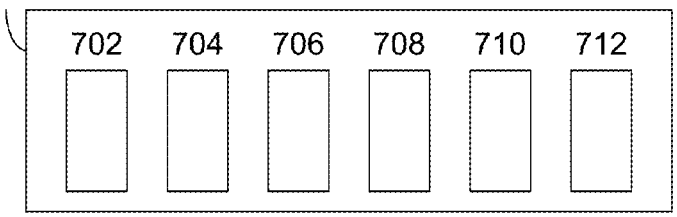
FIGS. 7A-7D illustrate embodiment for providing efficient sequential writes to a hard drive.

Referring to FIG. 7A, a hard drive physical memory space 700 is illustrated. The physical memory space may be the physical memory space provided by a single hard drive or a physical memory space provided by a collection of hard drives. In the illustrated example, the physical memory space 700 is divided into distinct blocks of storage, as reflected by exemplary blocks 702, 704, 706, 708, 710 and 712 with each block corresponding to a specific physical address.

In FIG. 7A, the blocks are arranged, for purposes of illustration and explanation, into a single row, with the physical addresses for the memory storage locations being such that the physical addresses increase sequentially from left to right. While FIG. 7A illustrates a single row of blocks, it will be appreciated, that the actual number of blocks of memory in a physical hard drive device can, and usually will, be substantially greater than those illustrated, extending into the thousands, hundreds of thousands and beyond.

Under the system and method of FIGS. 7A-7D the number and extent of the sequential WRITE operations to the physical memory space can be accomplished as follows. Initially the controller will receive a WRITE request from a host that contains data and a received address where the host would like for the data to be stored. This is reflected in step 800 of FIG. 8. In step 802 the controller will determine whether there is data stored in the hard drive physical memory that is already associated with the address received as part of the WRITE request. This can be done by determining whether the controller has an entry in the lookup table that associates the received addresses with the physical addresses in the physical hard drive memory space that contains the received physical address. If the determination in step 802 indicates that there is no data stored in the physical hard drive memory space associated with the received address, then the controller will associate the received address with the next sequential physical address in the physical hard drive memory space, write the received data to the assigned physical memory location, and update the look-up table used by the controller to associate the received address with the physical address in the hard drive's memory.

Figure 7B:
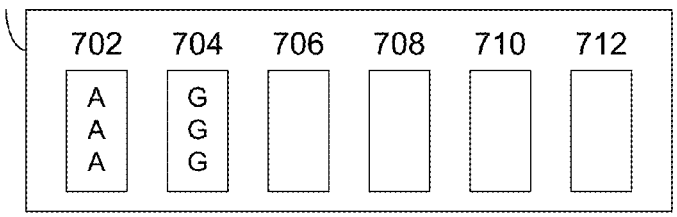
Figure 7C:
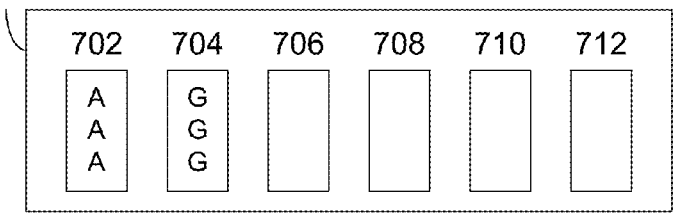

FIGS. 7A and 7B illustrate an example of this operation. In this example, it is assumed that the controller receives a WRITE request from a host to WRITE data AAA to a hypothetical address "10." It is further assumed that at the time the WRITE request was received, the writing head of the hard drive was located at a position where physical block 702 in FIG. 7A would be the next physically sequential address. Thus, in this example, the controller can associate the physical memory block address 702 with the received address "10" in the described look-up table, and write the received data AAA to the physical memory block address 702.

After completing this operation, the controller can return to step 800 and await another WRITE request. If a subsequent WRITE request is received for a received address for which there is no associated data stored in the physical hard drive memory, the described process can be repeated. Thus, for example, one can assume that a subsequent WRITE request is received from a host that seeks to write data GGG to a hypothetical address "60". Thus, in this example, since the next physical sequential address in the hard drive physical memory is at block 704, the controller can associate the physical memory block address 704 with the received address "60" in the described look-up table, and write the received data GGG to the physical memory block address 704. This is reflected in step 804 of FIG. 8 and in FIG. 7C.

After the system is operating, it is possible that a host can provide the controller with a WRITE request that seeks to write data to a received address for which associated data already exists within the physical hard drive memory space. For example, using the present example, after the described operations, a host could issue a WRITE request that seeks to write data FFF to the received address "10." In this example, there is already a physical address location 702 within the hard drive memory space associated with address "10" and there is already data (AAA) stored in that location. One approach would be to have the hard drive move its WRITE head to the physical location 702 previously associated with the received address "10" and write the newly-received data to that location. Such an operation, however, could result in substantial movement of the disk drive write head and impose wear and tear on the drive. In the present system this wear is avoided by having the controller, under such a condition, change the status of the data previously stored in the physical address 702 to STALE, create a new entry in its lookup table associating the received address "10" with the next available sequential physical address—in the example physical address 706—and write the new data received with the write request to the physical address 706. This is reflected in steps 806 and 808 of FIG. 8 and FIG. 7D.

Figure 7D:
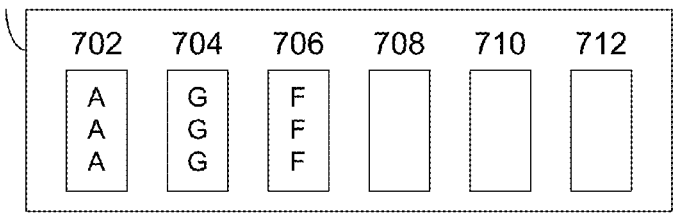
Figure 8:
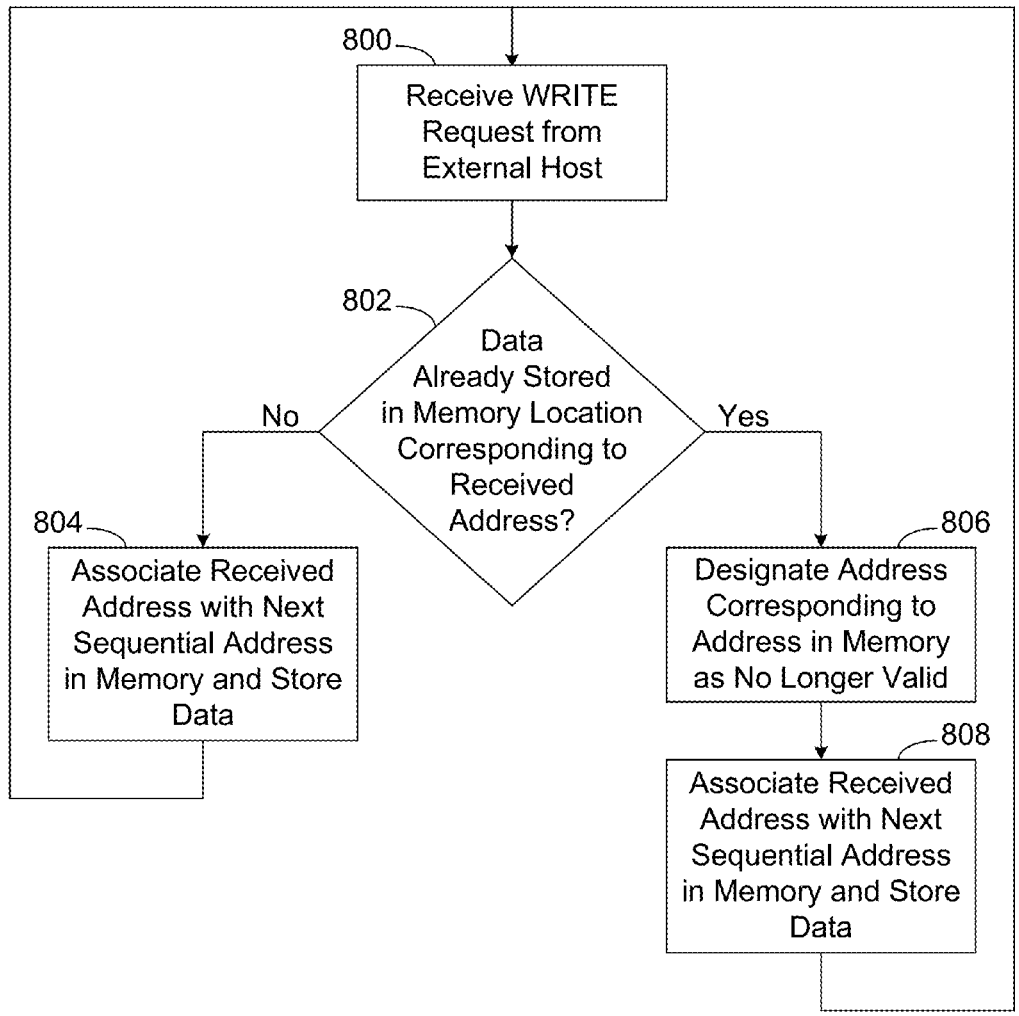
FIG. 8 illustrates a method in the form of a flow chart for providing efficient sequential writes to a hard drive.

Note that, in the illustrated example, FIG. 7D now contains a physical block location, 702, that contains STALE (or invalid data).

While the example of FIG. 7D reflects the changing of the status of the data previously stored in address 702 to STALE, alternate embodiments are envisioned where the record in the lookup table associated with address 702 could be deleted, instead of being set to STALE, thus making that address available for the storage of data. The use of a STALE status indicator, or the deleting of the entry, are just two examples of how the changed status of the data in address 702.

As may be appreciated, the described approach is beneficial because it tends to ensure that all of the WRITE operations to the physical hard drive are sequential operations.

Over time, the system and method described with respect to FIGS. 7A-7D and FIG. 8 may result in the establishment of a situation where virtually all (or a certain percentage) of the physical memory locations within the physical hard drive include stored data that is either valid data or that is STALE (invalid) data. This situation is generally reflected in FIG. 9, where the solid blocks represent valid data and the hatched blocks represent STALE (invalid) data. When this condition exists, there are various approaches that the present disclosure contemplates for ensuring that substantially all of the WRITE operations are sequential.

One approach that may be followed is to have the controller operate the hard drive such that the WRITE operations occur sequentially with respect to available blocks (e.g., blocks with STALE (invalid data). In this approach the hard drive head will be operated by the controller such that it will "skip" sequential blocks that already have valid data and it will move through (or over) the physical hard drive memory space until it gets to the end, and then—once the head has reached the end of the space—return to the beginning of the physical memory space and repeat the procedure. It is assumed, in this approach, that the number of WRITE operations will be such that, when the head returns to the initial starting point, there will be enough physical memory spaces that contain STALE data to process subsequently-received WRITE requests. If this approach is followed, using the example of FIG. 9 and assuming that the head is initially at a location where block 702 is the next sequential address, the controller would control the hard drive to write the data provided in the next received WRITE request to block 702 (which contains STALE data), then "skip over" blocks 704, 706 and 708 (since they contain valid data), and write the data received in the next WRITE request to the next available block at block 710.

While the approach described above in connection with FIG. 9 can be beneficially used, alternate approaches may be used. One such alternate approach is to have the hard drive head constantly write data sequentially on a physical-block by physical-block basis, skipping no block and writing over all blocks, even those that include valid data. This approach is generally illustrated in FIG. 10.

Figure 9:
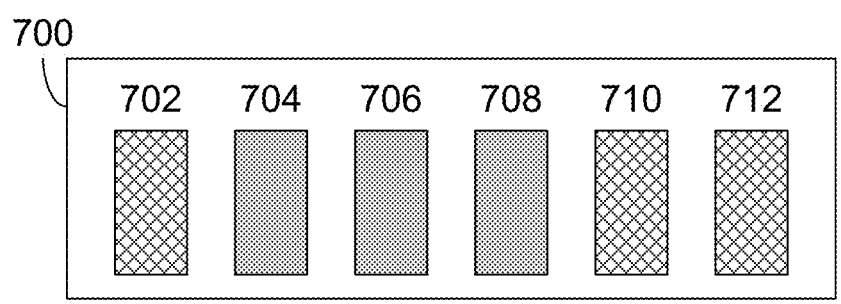
FIG. 9 illustrates another embodiment for providing efficient sequential writes to a hard drive.
Figure 10:
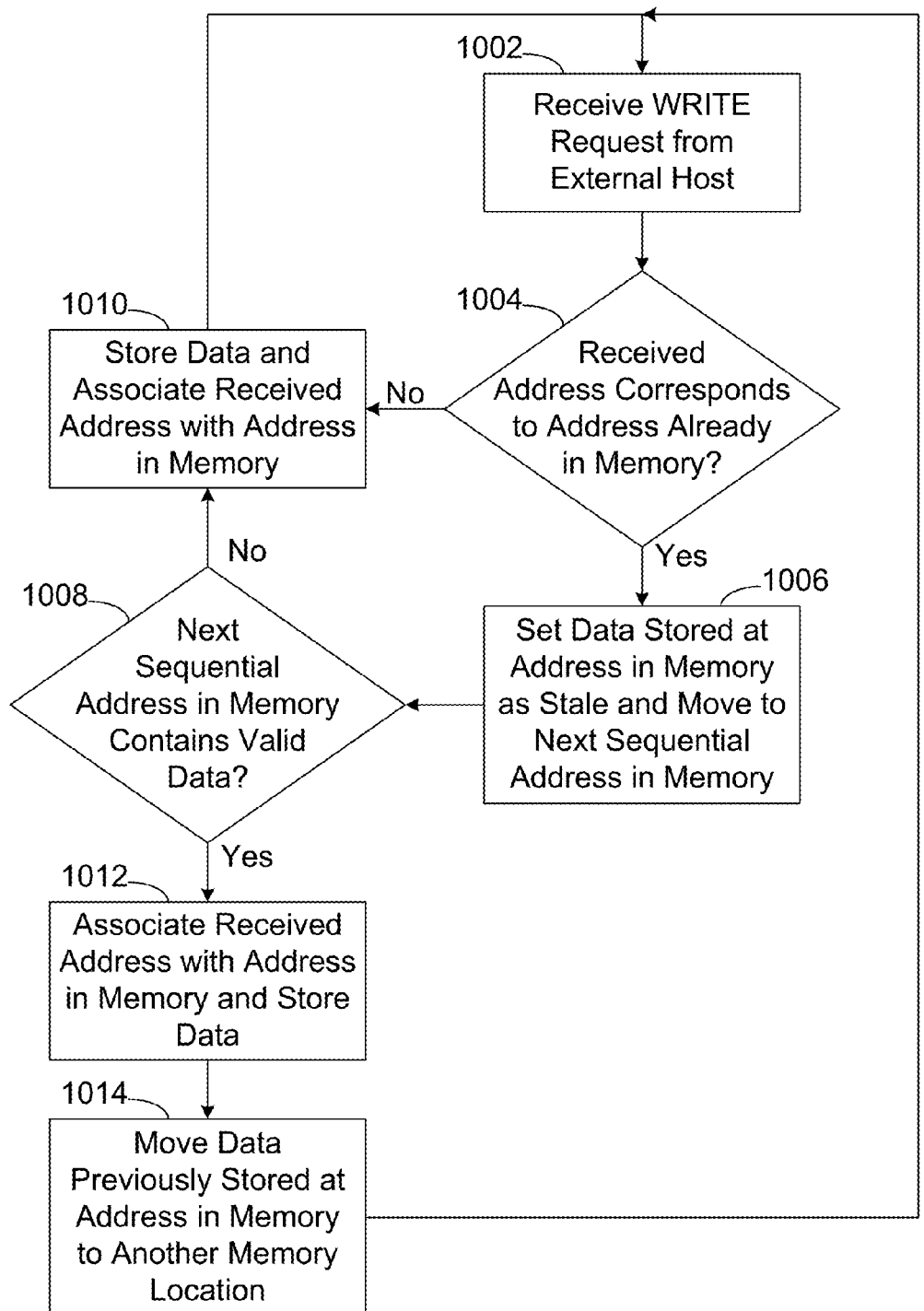
FIG. 10 illustrates another method in the form of a flow chart for providing efficient sequential writes to a hard drive.

For purposes of the following example, it is assumed that the physical memory has reached a point as reflected in FIG. 9 where all of its physical memory locations include data that is either valid (solid) or STALE (hatched). It is further assumed that the hard drive write head is initially at the location where physical block address 702 is the next sequential address.

In this approach, the controller will receive a WRITE request from a host that contains data and a received address. This is reflected in step 1002. The controller will then determine at step 1004 whether the received address already corresponds to a physical address in the hard drive memory. If so, the controller will set the data at that physical address to STALE and then look to the next physically sequential address location at step 1006. If the next physically sequentially address does not contain existing valid data (e.g., if it contains STALE data), as determined in step 1008, the controller will write the received data to that next physically sequential address and associate the next physically sequential address with the received address at step 1010. Thus, in the example of FIG. 10, the initial write request will result in the writing of the received data to physical block 702, since the block does not include valid data.

If the described process is followed, and the next sequential address does contain valid data, the controller will note the existence of valid data but will nonetheless write the received data to the next physically sequential address and associate that physical address with the received address. This is reflected in step 1012. However, because the next physical address contained valid data, the controller will also obtain the data that was previously stored in that address and will write that data to another physical location within the hard drive when the write head becomes available for such an operation. In this situation, the controller can obtain the data by performing a READ operation on the FLASH memory system accessible to the controller which, under normal operation, will contain a mirror of the valid data in the hard drive. Under this approach, the controller should perform the READ operation on the data in the FLASH memory system before the corresponding data in the physical hard drive is overwritten, to ensure that the data is the hard drive is available as back-up data in the event that there is an error in reading the data for the FLASH memory system. This is reflected in step 1014.

One of the benefits of the describe approach is that it provides for stable, small incremental movements of the hard drive write head and tends to ensure wear-leveling of the physical memory locations in the hard drive, thus prolonging the useful life of the disk drive (or drives).

To efficiently implement the approach described above it is beneficial to have a physical memory space within both the hard drive and the FLASH memory space that is greater than the available memory space reported to the host devices coupled the system. The reporting of available memory space that is greater than the FLASH memory space is important to allow for efficient use of the FLASH memory space and to provide a margin such that failures of regions of portions of the FLASH memory space do not result in a degradation—or a substantial degradation—of the reported available memory space. The use of a physical hard drive memory space that is greater than the reported memory space provides for more available memory locations that can be used to implement the described procedures. Because the FLASH memory is typically more expensive than hard drive memory, the reported memory space may be limited to approximately 75% or less of the available physical FLASH memory space. In some embodiments, the physical hard drive space can be substantially in excess of the reported memory space and the physical FLASH memory space. For example, in one exemplary embodiment, the hard drive memory space can be over 200% of the reported memory space and over 150% of the available physical FLASH memory space. For example, 12 Terabytes of physical FLASH memory and 20 Terabytes of hard drive memory can be used to provide an reported 9 Terabytes of available memory.

The example of FIG. 1 reflects the use of the teachings of this disclosure in a system where an external host communicates with a storage controller. Alternate embodiments are envisioned wherein the teachings of this disclosure are implemented in systems where a server (or host) accesses a FLASH memory system and a hard drive through the use of a host bus adapter (sometimes referred to as a "HBA"). One such example is shown in FIG. 11 which illustrates an exemplary embodiment of the storage system described herein utilizing a server and one or more host bus adaptors.

Figure 11:
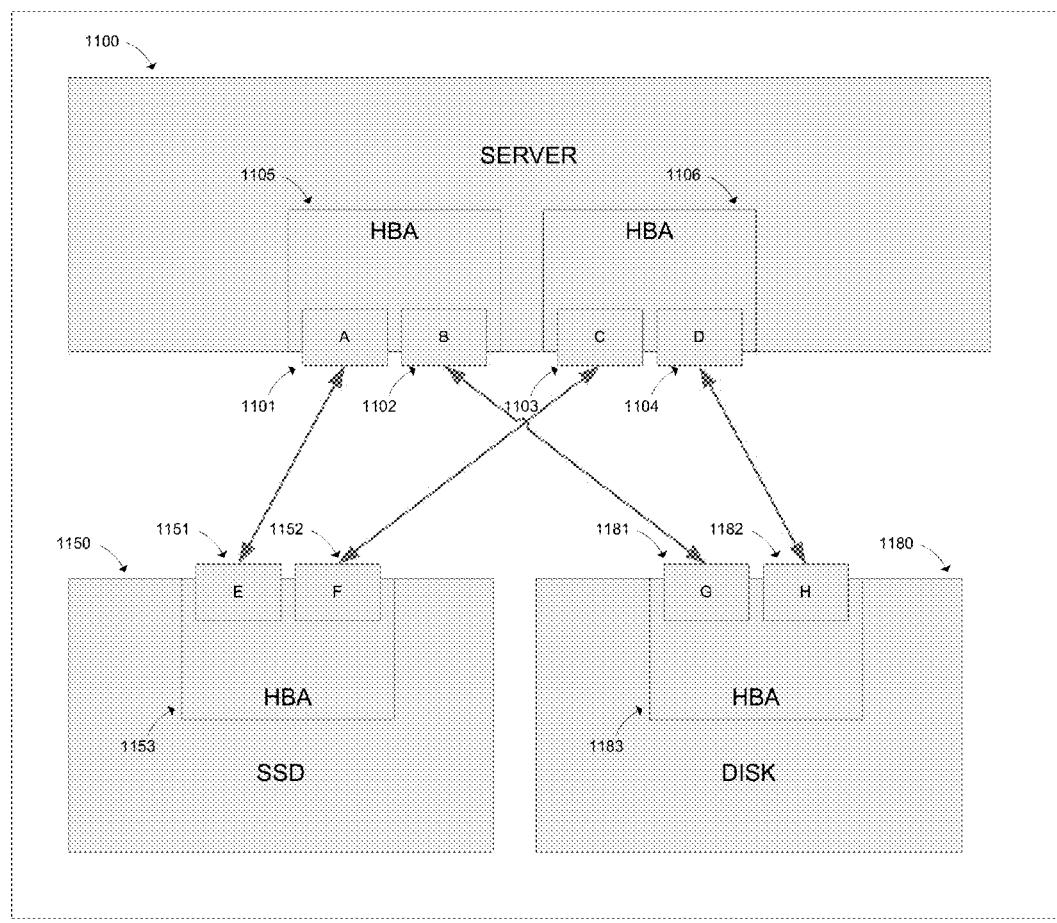
FIG. 11 illustrates an exemplary embodiment of the storage system described herein utilizing a server and one or more host bus adaptors.

Turning to the drawings, FIG. 11, a server 1100 is shown in accordance with the teachings of the present disclosure. The server 1100 may be any currently known or to-be-developed future server and may be, for example and without limitation, a Windows-based or Linux-based server, or a server running other known operating systems. The server 1100 may, in one example, be a Windows-based server running one or more programs. The server 1100 may operate as a stand-alone server or be part of a larger network.

Included in the server 1100 is a first host bus adapter ("HBA") device 1105. The first HBA device may include suitable interface circuitry (not specifically shown in FIG. 11) to interface with the physical components of the server 1100 so that software operating on the server can issue READ, WRITE and potentially certain control commands to the first HBA device 1105. In general, the function of the first HBA is to receive READ and WRITE requests from the server 1100 and to translate those requests into READ and WRITE requests that may be sent over a particular bus.

In the example of FIG. 11, the first HBA device 1105 may also include two physical communications ports A and B, denoted by numerals 1101 and 1102, respectively. Each of the physical communications ports A and B is coupled to a physical communications bus, indicated by the lines with double-headed arrows, that allow the first HBA device 1105 to communicate with a FLASH memory storage system ("SSD") 1150 and a disk drive storage system ("DISK") 1180, respectively. In the example of FIG. 11, the physical port A of the first HBA device 1105 is coupled via a first bus to a physical communication port E 1151, of a HBA device 1153 found in the FLASH memory storage system 1150, and the physical port B is coupled via a second bus to a physical communications port G 1181 of the disk drive storage system 1180.

In general, the function of the first HBA is to receive READ and WRITE requests (and potentially some control commands) generated by software running on the server 1100 and convert those requests into READ and/or WRITE requests suitable for transmission over one or both of the first and/or second communications bus. This allows the illustrated system to utilize software that has not been specifically tailored, or written for, the particular protocol and/or communications scheme utilized by one or both of the first or the second communications bus.

The specific protocol and physical nature of the first and the second communications bus can vary and any suitable protocol and/or physical layer may be used. For example, both the first and the second communications buses may be Infiniband buses. In an alternative embodiment, the first and second communications buses may be FibreChannel buses. In still another example, one bus may be a FibreChannel bus and the other bus an Infiniband bus. For purposes of the present example, both the first and the second communications buses are FibreChannel buses.

In the example of FIG. 11, a second HBA device 1106 is included in the server 1100 that, like the first HBA device 1105, has two physical communication ports, C and D (labeled 1103 and 1104). The physical communication ports C is coupled to the FLASH memory system 1150 and the physical communication ports D is coupled to the hard drive system 1180, respectively, via third and fourth communications buses and communications ports F and H (labeled 1152 and 1182). While the physical and logical characteristics of the third and fourth communications buses can differ from those of the first and second communications buses in some embodiments, in the illustrated example, all of the communications buses are FibreChannel buses. In general, the operation of the second HBA device is the same as that described herein with respect to the first HBA device.

Through the use of the physical structure described above in connection with FIG. 11, the systems and methods described above may be beneficially implemented in a variety of ways.

For example, in one approach, the server 1100 may run software that implements the methods previously described. In this approach, the software running on the server 1100 ensures that any data written to the FLASH memory system 1150 (by a WRITE request issued to either the first or the second HBA devices and subsequently carried over one of the communications buses to the physical communication ports E or F) is also written to the hard drive system 1180. The software running on the server 1100 may perform any methods necessary to ensure that the writes to the hard drive system 1180 are written primarily to sequential storage locations. The software running on the server 1100 may also use a preferred READ approach where data is read from the hard drive system 1180 only in the event there is a failure associated with a read from the FLASH memory system 1150.

While the above approach has many benefits, it requires that the software running on the server 1100 be developed with the specific intention of implementing some or all of the methods described herein. Such an approach may be less optimal in a system where the software on the server 1100 was not specifically written to implement the described methods.

An alternate approach would be to construct and configure one or both of the first and/or second HBA devices such that they are, in their general structure and function, similar to one of the storage controller 30 of FIG. 1 or the central processor 44 of FIG. 4, or the system controller 55 of FIG. 5. In this approach, the storage controller 30, central processor 44, or system controller 55 would receive READ and WRITE requests from software running on the server 1100 over the physical interface between the first and/or second HBA devices and the server 1100 instead of from a host over a bus, but the general operation of the first and/or second HBA devices would be similar to that previously described above in connection with the identified devices in FIGS. 1, 4 and/or 5.

While the alternative approach is beneficial, its implementation may require the use of specially-designed HBA devices and specialized hardware.

In a further alternative approach, only slight modifications to the existing HBA devices may need to be implemented. In this approach, HBA devices having the same general structure and operation as conventional HBA devices may be used, but with some modifications made to allow for beneficial implementation of the methods and systems described herein. While the following example will be discussed in the context of a FibreChannel HBA device, it will be understood that the described approach is applicable to other types of HBA devices.

In this further alternative approach, one or both of the first and/or second HBA devices is a modified device that will respond to either all or only certain WRITE requests received from the software running on the server 1100, depending on the implementation, by issuing mirrored WRITE requests to both the FLASH memory system 1150 and the hard drive system 1180. Thus, for example, the HBA device may receive a single WRITE request from the software on the server 1100 and, after being provided with or retrieving the data to be written as part of the WRITE request, issue one WRITE request to the FLASH memory system 1150 and another WRITE request to the hard drive system 1180. This mirrored WRITE operation may occur, in general, without any action or intervention of the software running on the server 1100, such that no specialized server software is required.

The use of a mirrored WRITE as described above may be a software and/or hardware setting or configuration that may be selected on the first and/or second HBA devices. The configuration can be done by setting one or more logic control bits stored in the HBA devices or by setting a hardware setting (e.g., adjustment of a switch, pin, etc.). When control bits are used, their configuration may be accomplished upon system startup or through the use of a control signal provided with each WRITE request (although this approach would require that the software running on the server be modified to account for the described structure). The above embodiments are merely examples of how the mirrored WRITE approach may be implemented and the use of other techniques will not depart from the teachings of the present disclosure.

It should be noted that, in the described examples, the operating hardware, firmware and/or software within the hard drive system could be modified or constructed to implement the techniques described above to promote sequential writes.

Through the use of the described further alternative approach, the described system would allow for the beneficial protective storage of mirrored data in both the FLASH memory system and the hard drive system without the need for custom or specially-written server software.

In one embodiment, the mirrored WRITES issued by the HBA devices may be simultaneous and may involve only a single transfer of data from the server 1100 to the HBA devices. In this embodiment, there may be a single transfer of data to the HBA devices and that data may be provided in WRITE commands issued at or nearly at the same time to both the FLASH memory system and the hard drive system. In alternate embodiments, the HBA devices may instead perform serial WRITES, one to the FLASH system and another to the hard drive system (each potentially requiring the transfer/receipt of the same data from the server). In such a system, techniques may need to be implemented to maintain coherency between the parallel data in the FLASH memory systems and hard drive system.

In the approach described above, READ operations may be performed in a conventional manner by the software running on the server 1100 and one or both of the HBA devices. However, it is possible to configure one or both of the HBA devices such that they would respond to any READ request from software running on the server by first issuing the READ request to the FLASH memory system, then issuing the READ request to the hard drive system in the event of a failure of the read from the FLASH memory system. The HBA device in this embodiment would then return the retrieved valid data to the requesting software. This approach would allow for the beneficial implementation of the methods described above, but without requiring specially-written software to be running on the server 1100.

A benefit of the further alternative approach described above is that it can be implemented using HBA structures that are generally available, but with firmware modified to implement the described approach and system.

In any of the systems described above, the first and second HBA devices may be constructed and used to provide redundancy or backup storage and one or both of the first and second HBA devices may be modified to implement the beneficial methods described above.

The above embodiments are illustrative and not limiting. Other and further embodiments utilizing one or more aspects of the inventions described above can be devised without departing from the spirit of the disclosed embodiments. Further, the order of steps described herein can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The disclosed embodiments have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants. Applicants intend to fully protect all such modifications and improvements that come within the scope or range of equivalent of the following claims.

What is claimed is:

1. A storage system having backup storage, comprising:
   a non-volatile memory configured as a primary storage for the storage system and providing a non-volatile storage space for the storage system;
   a backup hard drive providing a backup storage space for the non-volatile memory, the backup storage space being smaller by an integer factor than the non-volatile storage space and divided into a plurality of blocks; and
   a storage controller coupled to the non-volatile memory and the backup hard drive, the storage controller being configured to receive a WRITE request from an external host containing data and an address where the data is to be stored, and to write the data contained in the WRITE request to a physical location within the non-volatile memory and a physical location within the backup hard drive, the storage controller additionally configured to write the data contained in the WRITE request to the physical location within the backup hard drive such that WRITE operations to the backup storage space occur sequentially with respect to blocks having stale or invalid data so as to skip over sequential blocks in the backup storage space that have valid data;
   wherein the storage controller is further configured to receive a READ request from an external host containing an address from which data is to be read, access a physical location within the non-volatile memory corresponding to the address contained in the READ request, and provide data stored at the physical location to the external host in the absence of a READ error message from the non-volatile memory, and to access a physical location within the backup hard drive corresponding to the address received in the READ request and to provide data stored at that address to the host in the presence of a READ error message from the non-volatile memory.

2. The storage system of claim 1, wherein the storage controller is further configured to compact the data stored in the backup hard drive during idle time using data obtained from the non-volatile memory.

3. The storage system of claim 1, wherein the storage controller and the non-volatile memory are located within the same physical device.

4. The storage system of claim 1, wherein the storage controller is configured to provide an indication of overall storage space to an external host, and wherein the indication of overall storage space identifies a storage space that is less than the backup storage space provided by the backup hard drive and less than the non-volatile storage space provided by the non-volatile memory storage.

5. The storage system of claim 1, wherein the storage controller is further configured to store data protection information in the backup hard drive and wherein the storage controller is configured to calculate such data protection information using data obtained through issuance of READ operations to the non-volatile memory.

6. The storage system of claim 5, wherein the storage controller is configured to calculate the data protection information by performing XOR operations on data obtained from the non-volatile memory.

7. A method of backing up a storage system, comprising:
receiving, by a storage controller, a WRITE request from an external host, the WRITE request containing data and an address where the data is to be stored, the storage controller coupled to a non-volatile memory and a backup hard drive, the non-volatile memory configured as a primary storage for the storage system and providing a non-volatile storage space for the storage system, the backup hard drive providing a backup storage space for the non-volatile memory, the backup storage space being smaller by an integer factor than the non-volatile storage space and divided into a plurality of blocks;
writing, by the storage controller, the data contained in the WRITE request to a physical location within the non-volatile memory and a physical location within the backup hard drive, the storage controller writing the data contained in the WRITE request to the physical location within the backup hard drive such that WRITE operations to the backup storage space occur sequentially with respect to blocks having stale or invalid data so as to skip over sequential blocks in the backup storage space that have valid data;
receiving, by the storage controller, a READ request from an external host containing an address from which data is to be read;
accessing, by the storage controller, a physical location within the non-volatile memory corresponding to the address contained in the READ request;
providing, by the storage controller, data stored at the physical location to the external host in the absence of a READ error message from the non-volatile memory; and
accessing, by the storage controller, a physical location within the backup hard drive corresponding to the address received in the READ request and providing, by the storage controller, data stored at that address to the host in the presence of a READ error message from the non-volatile memory.

8. The method of claim 7, further comprising compacting, by the storage controller, the data stored in the backup hard drive during idle time using data obtained from the non-volatile memory.

9. The method of claim 7, wherein the storage controller and the non-volatile memory are located within the same physical device.

10. The method of claim 7, further comprising providing, by the storage controller, an indication of overall storage space to an external host, and wherein the indication of overall storage space identifies a storage space that is less than the backup storage space provided by the backup hard drive and less than the non-volatile storage space provided by the non-volatile memory storage.

11. The method of claim 7, further comprising storing, by the controller storage controller, data protection information in the backup hard drive and calculating, by the storage controller, such data protection information using data obtained through issuance of READ operations to the non-volatile memory.

12. The method of claim 11, further comprising calculating, by the storage controller, the data protection information by performing XOR operations on data obtained from the non-volatile memory.

13. A storage medium containing instructions for causing a storage controller to:
receive a WRITE request from an external host, the WRITE request containing data and an address where the data is to be stored, the storage controller coupled to a non-volatile memory and a backup hard drive, the non-volatile memory configured as a primary storage for the storage system and providing a non-volatile storage space for the storage system, the backup hard drive providing a backup storage space for the non-volatile memory, the backup storage space being smaller by an integer factor than the non-volatile storage space and divided into a plurality of blocks;
write the data contained in the WRITE request to a physical location within the non-volatile memory and a physical location within the backup hard drive, the instructions additionally causing the storage controller to write the data contained in the WRITE request to the physical location within the backup hard drive such that WRITE operations to the backup storage space occur sequentially with respect to blocks having stale or invalid data so as to skip over sequential blocks in the backup storage space that have valid data;
receive a READ request from an external host containing an address from which data is to be read;
access a physical location within the non-volatile memory corresponding to the address contained in the READ request;
provide data stored at the physical location to the external host in the absence of a READ error message from the non-volatile memory; and
access a physical location within the backup hard drive corresponding to the address received in the READ request and provide data stored at that address to the host in the presence of a READ error message from the non-volatile memory.

14. The storage medium of claim 13, wherein the storage controller and the non-volatile memory are located within the same physical device.

15. The storage medium of claim 13, further comprising instructions for causing the storage controller to provide an indication of overall storage space to an external host, and wherein the indication of overall storage space identifies a storage space that is less than the backup storage space provided by the backup hard drive and less than the non-volatile storage space provided by the non-volatile memory storage.

16. The storage medium of claim 13, further comprising instructions for causing the storage controller to store data protection information in the backup hard drive and calculating, by the storage controller, such data protection information using data obtained through issuance of READ operations to the non-volatile memory.

17. The storage medium of claim 16, further comprising instructions for causing the storage controller to calculate the data protection information by performing XOR operations on data obtained from the non-volatile memory.

* * * * *